United States Patent [19]
Johnson

[11] Patent Number: 5,454,629
[45] Date of Patent: Oct. 3, 1995

[54] METHOD AND APPARATUS FOR PRESSURE CONTROL

[75] Inventor: Bernard W. Johnson, Brighton, Mich.

[73] Assignee: Kelsey-Hayes Company, Romulus, Mich.

[21] Appl. No.: 230,803

[22] Filed: Apr. 21, 1994

[51] Int. Cl.$^6$ ........................................................ B60T 8/58
[52] U.S. Cl. ........................ 303/156; 303/159; 364/426.02
[58] Field of Search ............................................ 303/100, 103, 303/110, DIGS. 1–4; 364/426.02

[56] References Cited

U.S. PATENT DOCUMENTS

| | | | |
|---|---|---|---|
| 4,209,203 | 6/1980 | Brearly | 303/103 X |
| 4,985,839 | 1/1991 | Dominke | 303/103 |
| 5,150,299 | 9/1992 | Fujioka | 303/110 X |

Primary Examiner—Robert J. Oberleitner
Assistant Examiner—Lee W. Young
Attorney, Agent, or Firm—MacMillan, Sobanski & Todd

[57] ABSTRACT

Methods for brake pressure control in a vehicular antilock brake system wherein brake pressure is restored to within a window of peak brake pressure after a reduction in pressure in response to a forced departure during vehicle braking. In a preferred embodiment, the pressure reduction is adaptively controlled. The vehicle has a plurality of wheels and each wheel has brake. The method includes increasing brake pressure at a wheel so as to attain a prereduction peak brake pressure, and initiating a pressure reduction mode of operation wherein brake fluid flows from the brake of the wheel. The method also includes restoring the brake pressure at the wheel to the desired brake pressure after termination of the pressure reduction mode of operation without making actual brake pressure measurements.

13 Claims, 7 Drawing Sheets

METHOD AND APPARATUS FOR PRESSURE CONTROL

TECHNICAL FIELD

The present invention relates to a method and system for brake pressure control in a vehicular antilock braking system.

BACKGROUND ART

Vehicle manufacturers are increasingly including antilock braking systems (ABS) on vehicles. These systems are designed to increase the ability of a vehicle operator to bring a vehicle to a stop on road surfaces while also providing the stability and steering not available when wheels are locked, even if the surfaces are slippery.

It is desirable to design an ABS characterized by accurate pressure control, even though the dynamics under control are highly nonlinear and uncertain in nature and vehicles typically do not include on-board pressure transducers. It would also be desirable to develop models which accurately describe the dynamics of the pertinent processes, and to develop relationships for predicting pressure. It is also desirable to develop a theory which instructs how those models can be utilized, in conjunction with control objectives, to arrive at a near-optimal controller for an ABS. Once the relationships are in place, it would be desirable to develop a method and system for improved pressure control, wherein peak pressure is accurately attained and maintained after forced departures, and wherein the ABS utilizes an adaptive dump control to achieve minimum net dump times.

DISCLOSURE OF INVENTION

It is, therefore, an object of the present invention to provide models which accurately describe the dynamics of the pertinent processes for vehicular braking by an ABS.

It is a further object of the present invention to provide a near-optimal controller for an ABS, utilizing models which describe the dynamics of the pertinent processes for vehicular braking by an ABS.

It is yet still a further object of the present invention to provide a method and system for predictive pressure control for an ABS.

An additional object of the present invention is to provide a method and system for predicting the response of the dump and apply modes of braking control in a vehicular ABS.

In carrying out the above objects and other objects and features of the present invention, a method is provided, for use with a vehicle having a plurality of wheels each having a brake and a vehicular antilock braking system including an electronic control unit, for brake pressure control during vehicle braking. The method comprises increasing brake pressure at at least one wheel so as to attain a prereduction peak brake pressure, and initiating a pressure reduction mode of operation wherein brake fluid flows from the brake of the at least one wheel. The method also comprises determining a brake apply pulse required to restore brake pressure to within a pressure window of the prereduction peak brake pressure, and restoring the brake pressure at the at least one wheel to within the pressure window of the peak brake pressure after termination of the pressure reduction mode of operation.

In a preferred embodiment, the step of increasing brake pressure comprises initiating a brake apply mode of operation so as to force a departure between the velocity of the at least one wheel and a reference velocity which exceeds a predetermined threshold, and to obtain the prereduction peak brake pressure.

A system is also provided for carrying out the method.

The advantages accruing to the present invention are numerous. For example, the methodology of the present invention is based upon control algorithms which consider known input quantities and also unknown quantities, such as master cylinder pressure, for example. Although this quantity is unknown (due to the lack of pressure transducers on the vehicle), the methodology of the present invention is robust with respect to such unknowns, adjusting itself to embody those things known while remaining consistent with what is not quantitatively known.

The above objects and other objects, features, and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIGS. 3a–3b are shown graphs illustrating the theoretical brake balance of a vehicle, wherein FIG. 3a illustrates the relationship between the ideal or peak brake pressure and μ, and FIG. 3b illustrates the relationship between rear brake pressure and front pressure along with rear brake pressure resulting from proportioning;

BEST MODE FOR CARRYING OUT THE INVENTION

Figure 1:
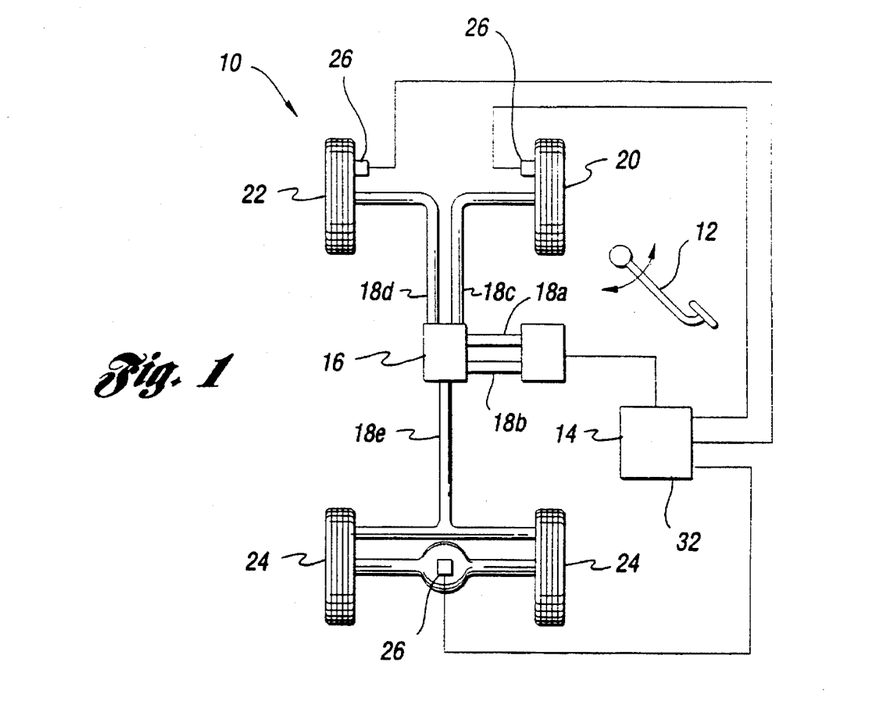
FIG. 1 is a schematic illustration of an antilock brake system (ABS) for use with the present invention.

Referring now to FIG. 1, there is shown a schematic diagram of the antilock brake system (ABS) for use with the present invention, designated generally by reference numeral 10. Although the system shown is generally referred to as a vertical split system, it should be understood that the present invention is equally applicable to other known system configurations, such as a diagonal system. The ABS 10 includes a brake pedal 12, a master brake cylinder 14, a control valve 16, brake fluid conduits 18a, 18b, 18c, 18d and 18e. As shown, the ABS is utilized in conjunction with a vehicle having front wheels 20, 22 and a pair of rear wheels 24.

As illustrated, the control system 10 of the present invention includes three vehicle wheel speed sensors, shown generally by reference numeral 26, which function to measure the velocity of each of the front wheels 20, 22, and the rear wheels 24. It should be understood that the present invention is not limited to a particular number of sensors. The control system also includes an ABS electronic control unit (ECU) 32. Each of the wheel sensors 26, as well as other well-known sensors not specifically illustrated for the sake of clarity, are in electrical communication with the ECU 32. As is well-known in the art, each of the wheel speed sensors 26 may comprise a stationary variable reluctance sensor positioned adjacent a toothed wheel (not specifically illustrated) which rotates with its respective vehicle wheel 20, 22, and 24. The variable reluctance sensors each generate a pulsed signal whose frequency varies directly with the speed of the wheels. Each of these signals is communicated to the ECU 32 by the wheel sensors 26 for use in accordance with the present invention, as described in greater detail below. Of course, other well-known wheel speed sensor configurations may also be employed.

The ECU 32, in turn, is itself in electrical communication with the ABS control valve 16. Although interconnections have been described as being electrical, it should be appreciated that other forms of connection, such as fiber optics, are possible.

For purposes of this discussion, the ECU 32 includes electronic componentry and executes software, permitting the ECU 32 to control the ABS according to the algorithm of the present invention. In the preferred embodiment, the ECU 32 includes a commercially available microprocessor. In general, the ECU 32 operates to determine both local and global control objectives, to activate the apply or dump valves, to control pressure or to hold pressure at its current level. For example, the ECU 32 functions as control means for determining a slip threshold, and control means for determining a departure depth. The ECU also functions as control means for comparing the departure depth to the slip threshold and actuating the control valve when the departure depth exceeds the slip threshold. This action isolates the individual vehicle wheel brakes in the hydraulic brake circuit from the master cylinder, thereby halting any increase in brake fluid pressure in the vehicle wheel brakes and preventing incipient vehicle wheel lock.

To activate the antilock brake system, the ECU 32 is operatively connected to the ABS control valve 16, which provides for regulation of the brake fluid pressure from the master brake cylinder 14 to the individual brakes (not specifically illustrated) of each of the wheels 20, 22, 24 via the brake fluid conduits 18a, 18b, 18c, 18d, and 18e.

The control system 10 of the present invention has been described and shown herein for use with an ordinary passenger vehicle ABS. However, it should be readily appreciated that the control method and system 10 of the present invention are suitable for use in any vehicles wherein an ABS may be required. For example, the present invention has applicability to independent rear control on medium duty trucks.

Generally, an ABS controller must continually force wheel departures in order to ensure that peak pressure has been attained. After a departure has been established, and brought back to recovery, the pressure must be returned quickly to the peak pressure for good performance. This describes the fundamental behavior of a good ABS controller. Given that a model that predicts the pressure response of the dump and apply modes of control is embedded into the control algorithm, it is natural to request of the controller that it return pressure to within a specified control region of the pressure prior to the dump mode. A controller designed in this manner is generic and becomes completely parametrized in terms of control objectives and hardware attributes, such as orifice size, wheel base, and the like.

Figure 2:
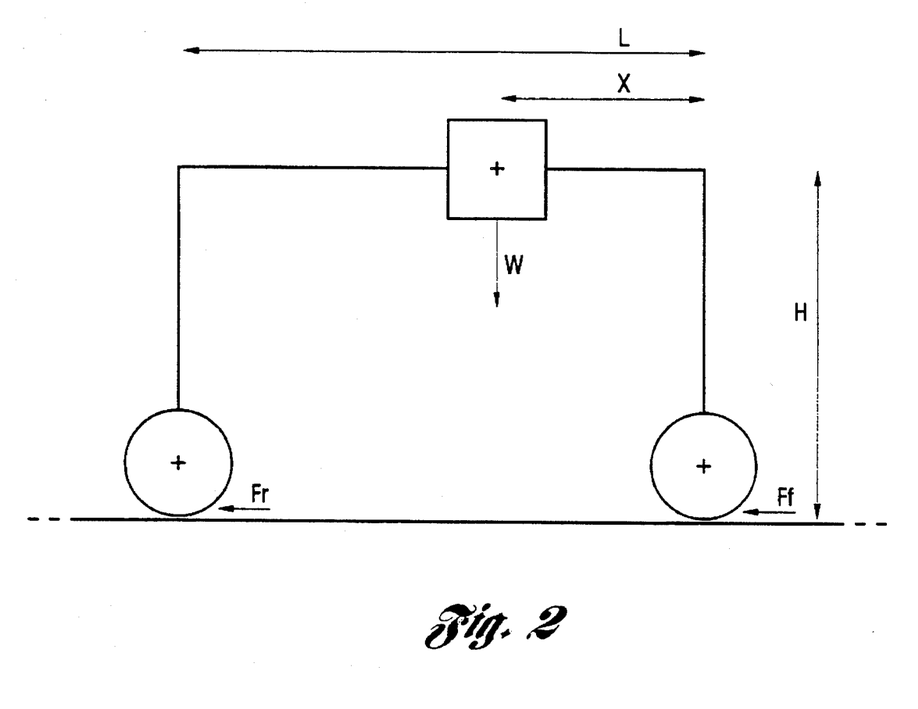
FIG. 2 is a block diagram of a half vehicle model useful for discussing vehicle geometry and brake balance.

Referring now to FIG. 2, there is shown a half vehicle model useful for discussing vehicle geometry and brake balance. A moment and force analysis of the half vehicle model yields the maximum deceleration forces at the front and rear axles. It can be shown that the maximum deceleration force at the front axle ($F_f$) and at the rear axle ($F_r$) can be determined as follows:

$$F_f = \mu * W * [L - X + H * \mu]$$

$$F_r = \mu * W * [X - H * \mu] \qquad (1)$$

wherein W is the half vehicle weight, H is the center of gravity height, $\mu$ is the coefficient of friction and X is the distance between the front axle and the center of gravity.

Brake pressure ($P_{f,r}$) is assumed to be linearly related to these deceleration forces:

$$F_f = P_f * K_f$$

$$F_r = P_r * K_r \qquad (2)$$

Substituting Equation #2 into Equation #1 produces a quadratic expression relating peak brake pressure to vehicle geometry:

$$P_f = \mu^2 * A_f + \mu * B_f$$
$$P_r = \mu^2 * A_r + \mu * B_r \qquad (3)$$

where $$A_f = \frac{W*H}{L*K_f} \; ; A_r = \frac{-W*H}{L*K_r}$$
$$B_f = \frac{W*(L-X)}{(L*K_f)} \; ; B_r = \frac{W*X}{(L*K_r)} \qquad (4)$$

Using Equation #3 and the brake pressure versus $\mu$ information measured on a vehicle, the brake force constants (i.e. $K_f$ and $K_r$), can be solved for:

$$K_f = \frac{\mu * W * (L - X + H * \mu)}{(1 * P_f(\mu))} \qquad (5)$$

$$K_r = \frac{\mu * W * (L - H)}{(1 * P_r(\mu))}$$

Figure 3A:
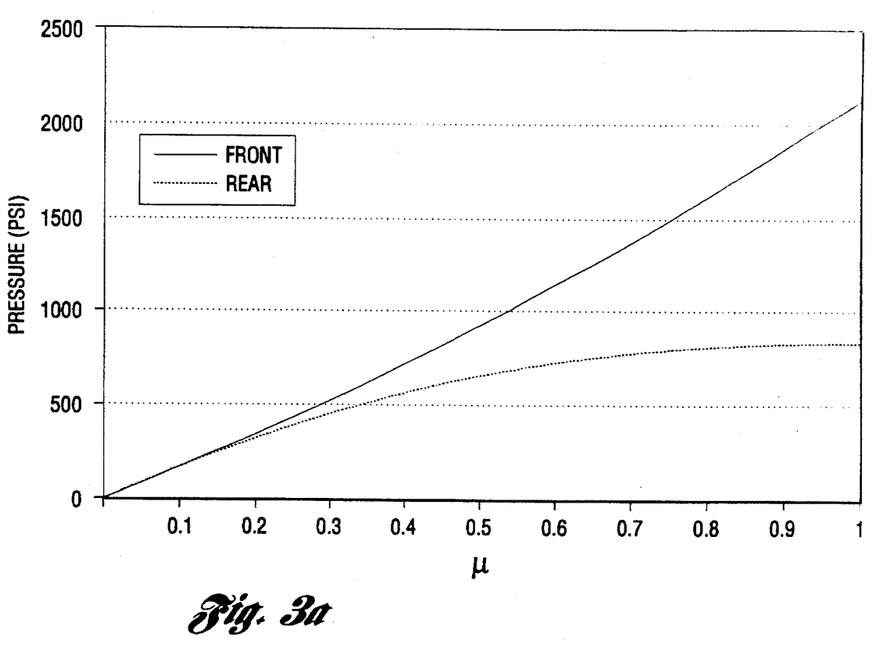
Figure 3B:
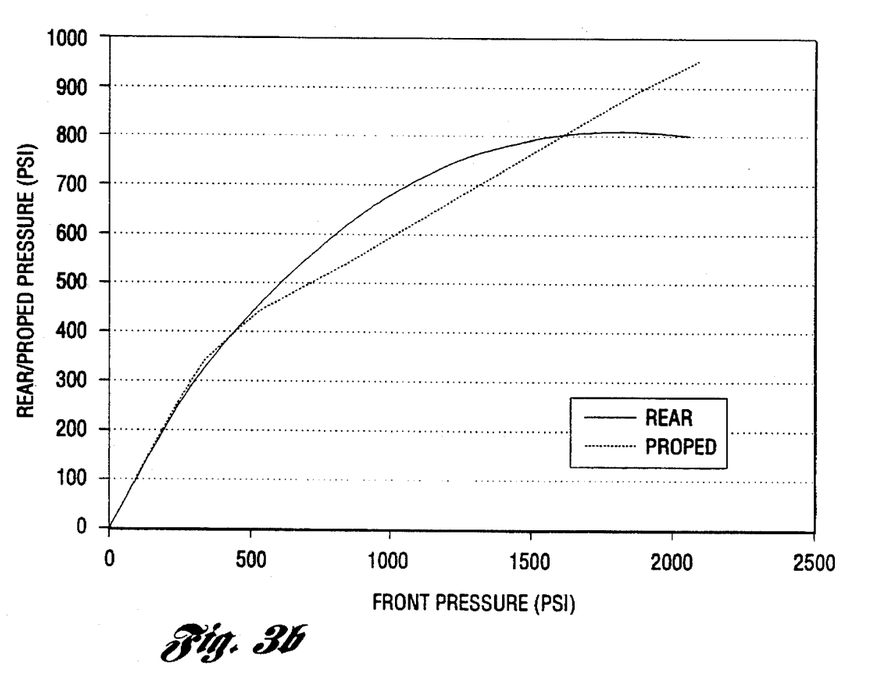

Equations #3 and #5 describe the brake balance of the vehicle as a function of vehicle geometry. With the assumption that vehicle deceleration is equal to $\mu$, the peak brake pressure is therefore known as a function of average vehicle deceleration. This can be restated in signal flow form as follows:

Referring now to FIGS. 3a–3b, there are shown graphs illustrating the theoretical brake balance of a vehicle. FIG. 3a illustrates the relationship between optimal brake pressure and $\mu$, whereas FIG. 3b illustrates the relationship between rear/proportioned (proped) brake pressure and rear optimal pressure. The pressures indicated in these graphs should closely agree with the maximum pressures allowed for on any given surface for its corresponding peak $\mu$.

The above analysis provides peak brake pressure as a function of specific vehicle information and average vehicle deceleration. Assuming that the ABS algorithm does not call for a reduction in the brake pressure until peak pressure is attained, the initial pressure prior to pressure reduction (in the dump mode) is equal to peak pressure. The following discussion defines pressure response to dump solenoid pulse width.

The flow of hydraulic fluid through a sharp-edged orifice can be approximated by the following equations:

$$Q = -Kd * (DP)^{1/2} \quad (6)$$

$$Q = \frac{dV}{dt}$$

$$Kd = \frac{100 * \Pi * DD^2}{4}$$

wherein DP is the pressure differential across the orifice, Kd is the dump orifice gain, DD is the dump orifice diameter, V represents volume, and t is time. It can be stated that $$\frac{dP}{dt} = \frac{dV}{dt} * \frac{dP}{dV} \quad (7)$$

The quantity dP/dV is available by measuring the pressure versus volume characteristics of the brake of concern. It has been found that the P-V characteristic can be approximated by the following equation:

$$\frac{dP}{dV} = KBd * P^{1/2}$$

wherein KBd represents a constant used for adjusting the approximation of the characteristic.

Figure 4A:
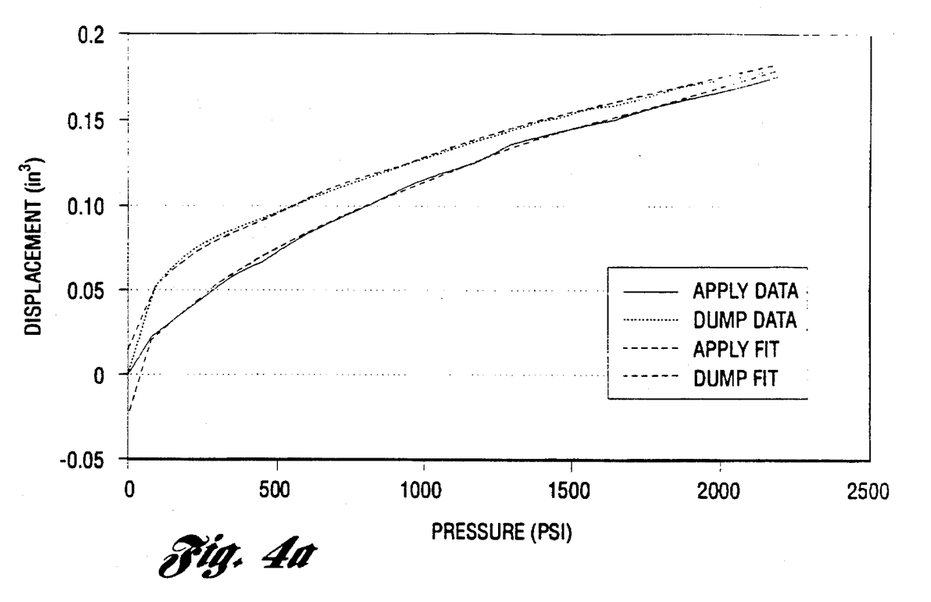
FIG. 4a illustrates a family of front brake volume displacement versus pressure curves regarding the apply mode (flow into the brakes) and dump mode (flow out of the brakes)

The P-V curve is parametrized by KBd for fluid flow out of the brakes (dump mode) and KBa for fluid flow into the brakes (apply mode). This allows the hysteresis in the brakes to be considered. FIG. 4a illustrates how Equation #8 approximates a set of P-V curves. Combining Equations #6–#8 results in a differential equation describing pressure rate:

$$-\frac{dP}{P} = KBd * Kd * dt \quad (9)$$

Integrating Equation #9, and using as boundary conditions $$P = POd @ t=0 \quad (10)$$

the following equations result:

$$Pd(t) = POd * e^{[(-25 * \Pi * DD^2 * KBd * t_D * TFAC]} \quad DP = POd - Pd \quad (11)$$

wherein $t_D$ represents net dump time, and TFAC is a temperature compensation factor determined as follows:

$$TFAC = 0.008 * TEMP + 0.05 \quad (12)$$

wherein TEMP, the ambient temperature, is measured in °F. Thus, $$DP(t) = POd * (1 - e^{[-25 * \Pi * DD^2 * KBd * t_D * TFAC]}) \quad (13)$$

Figure 4B:
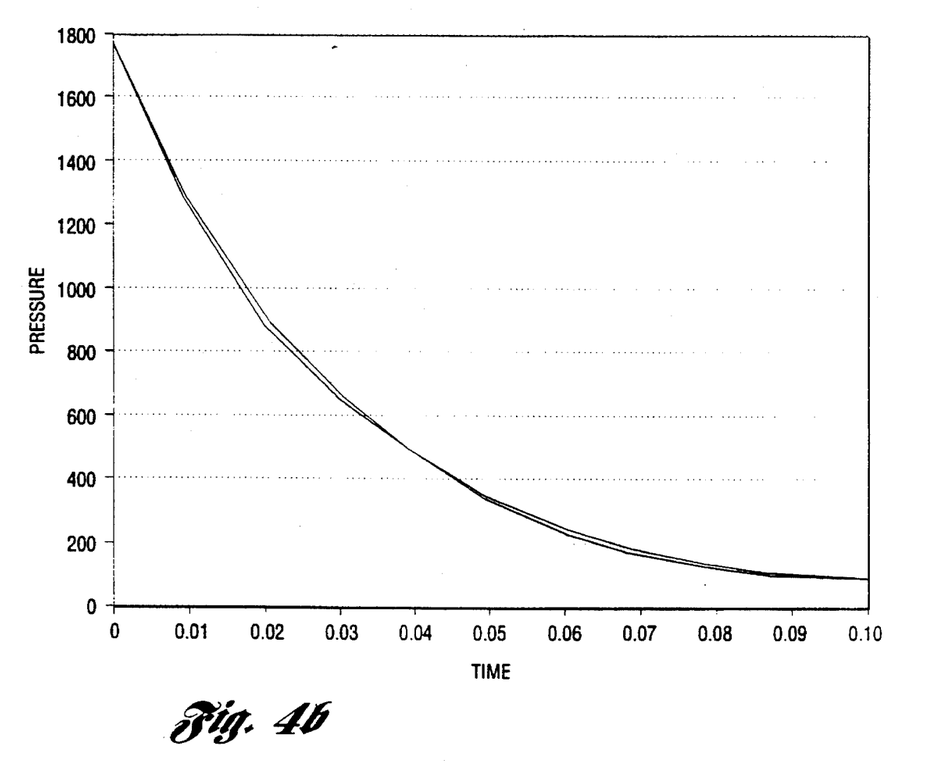
FIG. 4b is a graphical illustration of the agreement between a prediction of pressure versus time and an actual pressure versus time measurement for flow out of the brakes.

From Equation #9, it can be seen how both brake stiffness and orifice size effect pressure reduction as a function of time. Referring now to FIG. 4b, there is shown a graphical illustration of the agreement between the prediction made by Equation #11 and actual vehicle measurements.

The temperature dependence of Equation #11 is approximated with the temperature compensation factor TFAC as indicated. Note that this equation, as well as the other results presented herein, is useful as a general tool. For example, Equation #11 can be used to predict the orifice size of other systems if pressure response data is available.

Figure 4C:
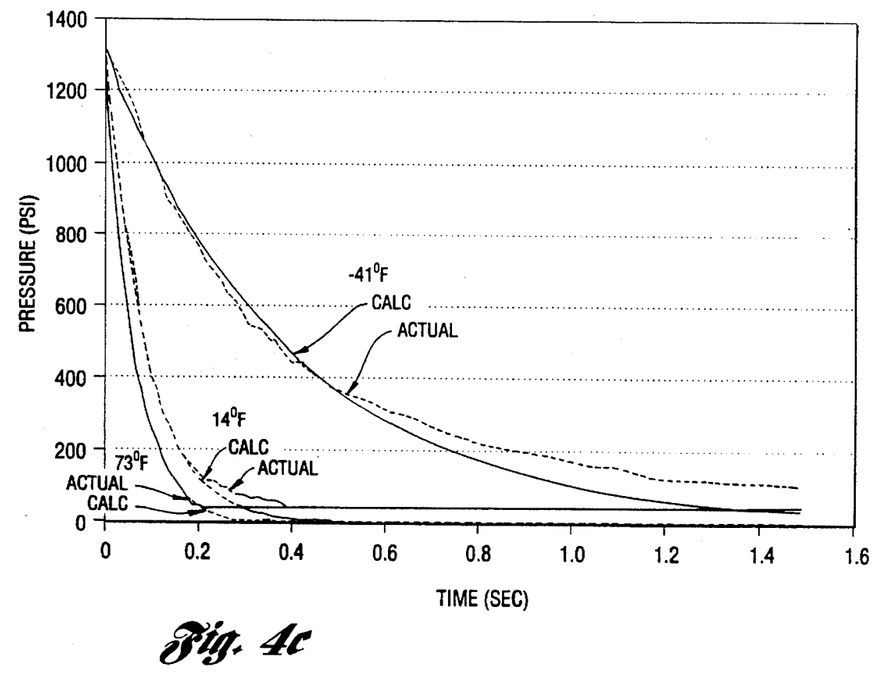
FIG. 4c is a graphical illustration of the viscosity effects, in particular temperature effects on pressure control, in a particular dump response.

FIG. 4c illustrates the effects of temperature on dump response. As indicated, when temperature drops, the viscosity of the ABS hydraulic fluid increases and response time increases. Flow (Q) into the brakes can be described by:

$$Q = Ka * (P_H - P)^{1/2} \quad (14)$$

$$Q = \frac{dV}{dt}$$

wherein $$Ka = \frac{100 * \Pi * DA^2}{4} \quad (15)$$

and wherein $P_H$ represents the high pressure source, such as a pump or master cylinder. As in the dump response discussed above, dP/dV is available from P-V curves. Combining Equation #14 with the following Equations #16 and #17, $$\frac{dP}{dV} = Ka * P^{1/2} \quad (16)$$

$$\frac{dP}{dt} = \frac{dV}{dt} * \frac{dP}{dV} \quad (17)$$

yields a differential equation describing pressure rate:

$$\frac{dP}{(P_H * P - P^2)^{1/2}} = KBa * Ka \, dt \quad (18)$$

Integrating Equation #18 and using the appropriate boundary conditions, the pressure response during an apply is obtained:

$$t_a = \frac{A\cos\left(\frac{1 - 2P(t_A)}{P_H}\right) - A\cos\left(\frac{1 - 2POa}{P_H}\right)}{KBa * Ka} \quad (19)$$

wherein $t_A$ is the net apply solenoid open time, and $P(t_A)$ is the resulting pressure due to $t_A$.

Equation #19 states that given an initial pressure POa and a high pressure $P_H$, the relationship between $P(t_A)$ and $t_A$ is known. As was the case for the dump response, the accuracy of Equation #19 can be verified by comparison to data taken from an actual vehicle application.

Although the effects of temperature have been considered for the dump mode, no model has of yet been investigated for predicting the corresponding effect during the apply mode. It should be noted, however, confidence may be gained in considering the fact that temperature will effect both the apply and dump modes similarly, i.e. the temperature effects will cancel to a degree in terms of pressure control. Furthermore, there is no known lack of robustness particular to this algorithm structure due to temperature.

Equations #3–#5 for brake balance, #11 for dump response, and #19 for apply response are the main results and are rewritten here as Equations #20–#22, #23, and #24, respectively, for convenience.

$$P_f = \mu^2 * A_f + \mu * B_f$$
$$P_r = \mu^2 * A_r + \mu * B_r \quad (2)$$
$$POd = P_{f,r}$$

$$A_f = \frac{W*H}{L*K_f} \; ; A_r = \frac{-W*H}{L*K_r} \quad (21)$$
$$B_f = \frac{W*(L-X)}{(L*K_f)} \; ; B_r = \frac{W*X}{(L*K_r)}$$

$$K_f = \frac{\mu*W*(L-X+H*\mu)}{(1*P_f(\mu))} \quad (22)$$
$$K_r = \frac{\mu*W*(L-H)}{(1*P_r(\mu))}$$

$$Pd(t) = POd*e^{[-25*II*DD^2*KBd*t_D*TFAC]} \quad (23)$$

$$t_A = \frac{Acos\left(\frac{1-2P(t_A)}{P_H}\right) - Acos\left(\frac{1-2POa}{P_H}\right)}{KBa*Ka} \quad (24)$$

The pressure control scheme of the present invention is one which returns the pressure to a value related to the pressure prior to pressure reduction (i.e. dump). Letting PC be defined as the desired pressure control window, we have:

$$P(t_A) = POd - PC$$

$$POa = d(t_D) \quad (25)$$

Substituting Equation #25 into Equation 24 yields:

$$t_A = \frac{Acos\left(\frac{1-2[POd-PC]}{P_H}\right)}{KBa*25*II*DD^2} - \frac{Acos\left(\frac{1-POd*e^{(-25*II*DD^2*KBd*t_D)}}{P_H}\right)}{KBa*25*II*DA^2} \quad (26)$$

It should be noted that the variables $t_D$ and $t_A$ represent the total amount of solenoid activation time. POd is defined in Equation #20 above, and $P_H$ is assumed unknown. Equation #26, in conjunction with Equation #20, defines the apply time $t_A$ required to restore the brake pressure to within PC psi of the pressure existing prior to the pressure reduction mode, and can be used to generate a family of curves such as those shown in FIG. 6a. Equation #26 contains valve and brake characteristics, while Equation #20 defines the peak pressure allowed for by the surface as a function of vehicle geometry.

Figure 5A:
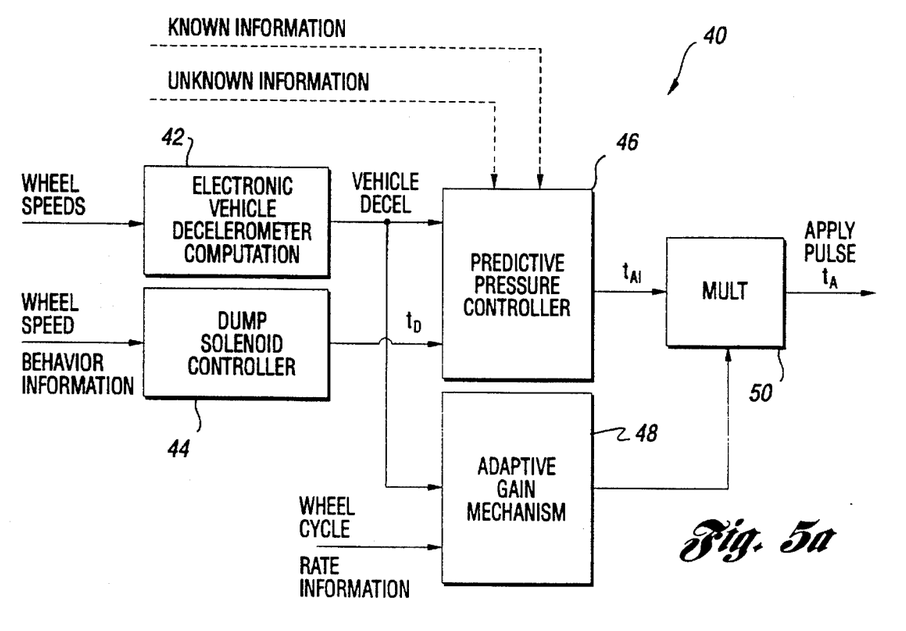
FIG. 5a is a diagram illustrating the block diagram for apply pulse generation according to the present invention.
Figure 5B:
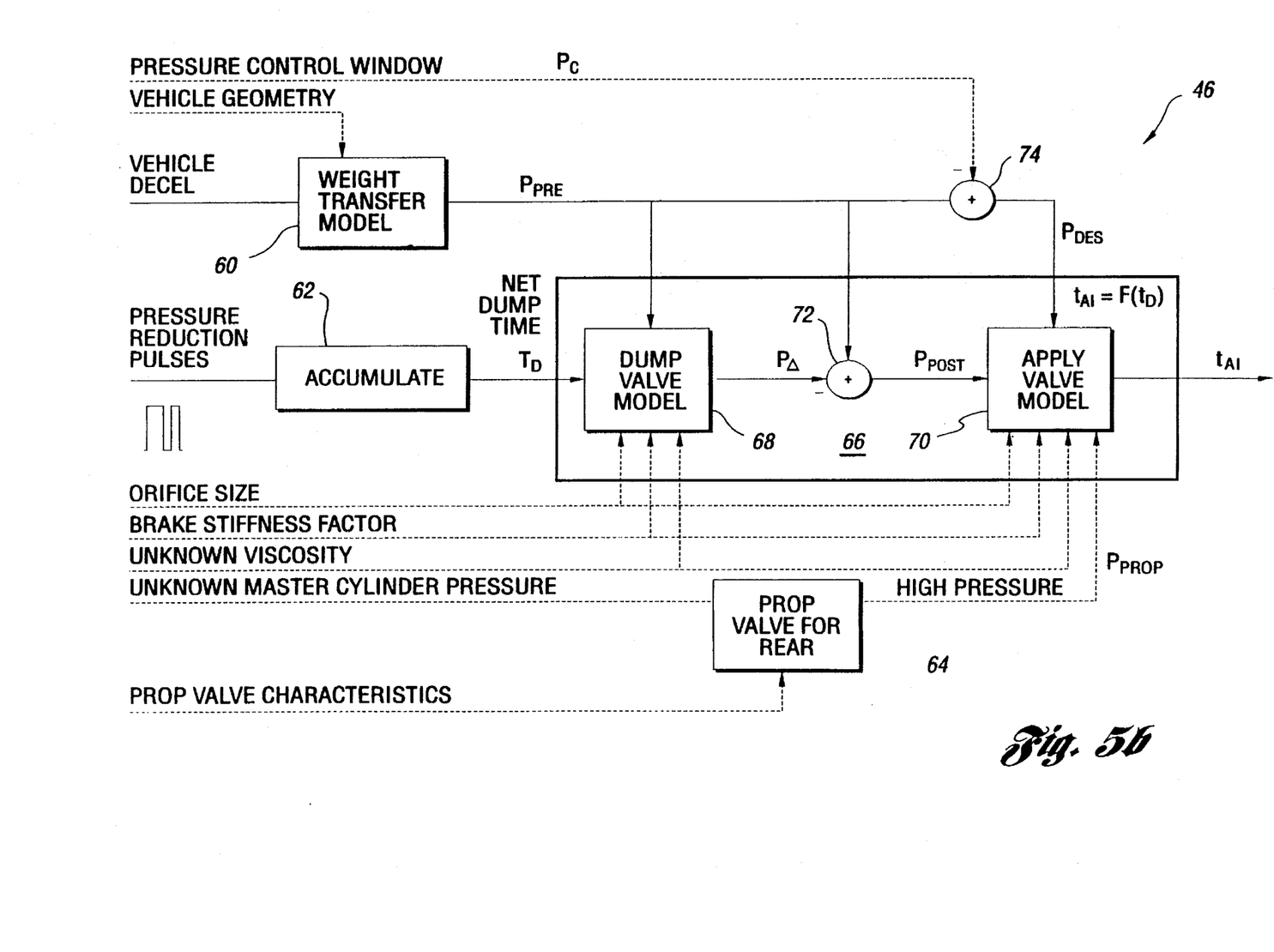
FIG. 5b illustrates the block diagram for the predictive pressure controller according to the present invention.

Referring now to FIGS. 5a–5b, there are shown block diagrams describing the connection of these results for predictive pressure control according to the present invention. More specifically these figures illustrate a controller which embodies the formulation of vehicle physics so as to, if given the unknown and known information, carry out the algorithm of the present invention which predicts pressure, or, more appropriately, which attempts to maintain a peak pressure.

An ABS algorithm, as long as there is some kind of an integral or open loop apply sequence, will indeed reach peak pressure, causing the wheel to decelerate toward zero speed, or lock; this is referred to herein as forcing departures. Generally, departures are forced in order to make sure that the system approaches, attains, and surpasses the peak adhesion that the surface will allow, with the assumption that the friction relationship between slip and friction has a single peak or a global maximum. If that μ-slip relationship has one maximum and it is a global maximum, then forcing a departure implies directly that the maximum was attained. If there is another peak, or if the relationship is monotonic and keeps going up as far as adhesion and slip, then the assumption is false. Even if the assumption is false, another factor is that not only is the objective of an ABS algorithm to decelerate, but also to maintain some control or lateral adhesion to permit stability and steering. For the case where the μ-slip curve continues to increase with slip, the appropriate trade-off between stopping distance (longitudinal adhesion) and lateral adhesion is made by adjusting the slip threshold used in identifying a departure. One method of determining whether the peak has been exceeded is to monitor for an instability in the wheel—look for some behavior that indicates that some slip has been exceeded. When a departure is forced for the reasons discussed above, pressure needs to be reduced so as to reduce wheel torque quickly. In the preferred embodiment, once the departure is forced, the controller will dump in response, thereby reducing brake torque.

Referring now to FIGS. 5a–5b, restoring pressure to a desirable level after the dump involves determination of the proper apply pulse for controlling the valve. More particularly, FIG. 5a illustrates the block diagram for apply pulse generation, and FIG. 5b illustrates the block diagram for the predictive pressure controller according to the present invention.

As shown in FIG. 5a, the apply pulse generation system, shown generally by reference numeral 40, includes an electronic vehicle decelerometer 42, a dump solenoid controller 44, a predictive pressure controller 46, an adaptive gain mechanism 48 and a multiplier 50 electrically interconnected as shown. The electronic vehicle decelerometer 42 determines the vehicle deceleration and generates a corresponding deceleration signal, which is then provided to both the predictive pressure controller 46 and the adaptive gain mechanism 48 as shown. The dump solenoid controller 44, under control of the algorithm, energizes the dump solenoid to dump the brakes and generates a dump signal $t_D$ representing the net dump time which, as shown, is an input to the predictive pressure controller 46. The predictive pressure controller, which embodies the present invention, generates an apply pulse $t_{A1}$ in light of these inputs and, due to tuning ability, is robust to other certain unknown information, such as temperature and $P_H$, as indicated by the dotted line. The adaptive gain mechanism 48 functions to adjust the vehicle decel signal, as discussed below, and modify the apply pulse $t_{A1}$ at block 50, to obtain the apply pulse $t_A$ for energizing the brake system solenoids.

In determining the apply pulse $t_{A1}$, the predictive pressure controller 46 utilizes the net time $t_D$ that the dump valve is opened. According to the algorithm, a wheel is monitored and the dump valve is opened and closed. Thereafter, inventory is taken as to the net amount of time the dump valve was open. The physics of the process discussed herein provides a relationship between the net dump time and the pressure change due to fluid flowing out of the brakes as a function of initial pressure head, which is deduced from vehicle deceleration.

As discussed above, there is a relationship to the brake balance between vehicle deceleration and the pressure-volume characteristics and how that fluid will flow out of the brakes. Additionally, there is a dual relationship for putting that fluid back into the brakes. Those two relationships are brought together to form the relationship between the dump and the apply utilized by the present invention. Given that relationship, there is one set of relationships that predicts the amount of pressure lost during dump (Equation #11), and another that predicts how much pressure needs to be returned to the system (Equation #26). As previously noted, the present invention does not require an actual pressure measurement, nor is pressure is directly calculated. The amount of pressure to be returned is biased by some pressure control window, PC, so that the wheel is not immediately forced into a departure. Preferably, the amount of pressure returned is that amount needed to return to a pressure that is very close to the peak pressure—the pressure existing just prior to the dump action.

As previously noted, that pressure can be determined as a function of vehicle deceleration. It should be appreciated that for different road surfaces (i.e. different values of μ), there are different pressures at which departures will be forced. If a particular road surface provides a particular deceleration, there is an associated particular pressure which will force a departure. Thus, deceleration can be utilized to determine what the pressure was just prior to the dump action. However, global behavior, not just local behavior, is of interest, since road surfaces change. Thus, it should be appreciated that the vehicle deceleration signal generated by block 42 of FIG. 5a is an approximation, and can track the surface adhesion within the error of the filtering performed in the algorithm.

With additional reference to FIG. 5b, there is shown a detailed block diagram of the predictive pressure controller 46 of the present invention shown in FIG. 5a. As shown in FIG. 5b, the predictive pressure controller 46 includes a weight transfer model block 60, an accumulate block 62, a proportional valve block 64, and an apply pulse block 66, which includes a dump valve model block 68 and an apply valve model block 70.

The vehicle deceleration signal generated by the electronic vehicle decelerometer computation 42 and vehicle geometry data are applied to the weight transfer model block 60. This model embodies vehicle geometry parameters discussed above with reference to, for example, FIG. 2. A prereduction pressure signal ($P_{PRE}$) is generated by the model 60 and is provided to the dump valve model block 68, and summers 72 and 74. As previously noted, this prereduction pressure is substantially equal to peak pressure. The accumulate block 62 receives a plurality of pressure reduction pulses, accumulates the same, and generates a net dump time signal $t_D$ from the pressure reduction pulses. As shown in FIG. 5b, the signal $t_D$ is then provided to the apply pulse block shown generally by reference numeral 66 and, more specifically, to the dump valve model block 68. Generally, valve behavior varies, such that the time required to open or close varies.

With continuing reference to FIG. 5b, based on the peak pressure signal $P_{PRE}$ and the net dump time $t_D$, the dump valve model block 68, which embodies the relationships discussed above, outputs a pressure change signal $P_A$. The net dump time is related to the pressure change—if the length of time the valve is opened is known, the quantity of fluid that flowed out of the brakes can be determined, based on prereduction pressure. Once $P_A$ is obtained, it is subtracted from peak pressure $P_{PRE}$ at the summer 72, to obtain a post-reduction pressure signal ($P_{POST}$), which represents the brake pressure after completion of the dump mode. As shown, a pressure control window PC (e.g. 150 psi) is subtracted from the peak pressure at summer 74 to obtain a desired pressure signal ($P_{DES}$), which represents the pressure to be returned to. These two signals are provided to the apply valve model block 70, which applies the relationships discussed above to generate the apply pulse $t_{A1}$ which, after being modified at block 50 as discussed above with reference to FIG. 5a, will control the amount of time the apply solenoid is opened.

Equation #26, along with the supporting equations shown above, provides a useful set of tools in understanding the fundamental interrelationships between specific parametric information. A spreadsheet containing the information presented to this point can be used for visualizing the effect of parameter variation. For a given master cylinder pressure, a family of curves can be produced which define the apply pulse size to return the pressure to within PC (the specific pressure control window) of PO (the pressure existing just prior to either an apply action or a dump action), for specified coefficients of friction.

Figure 6A:
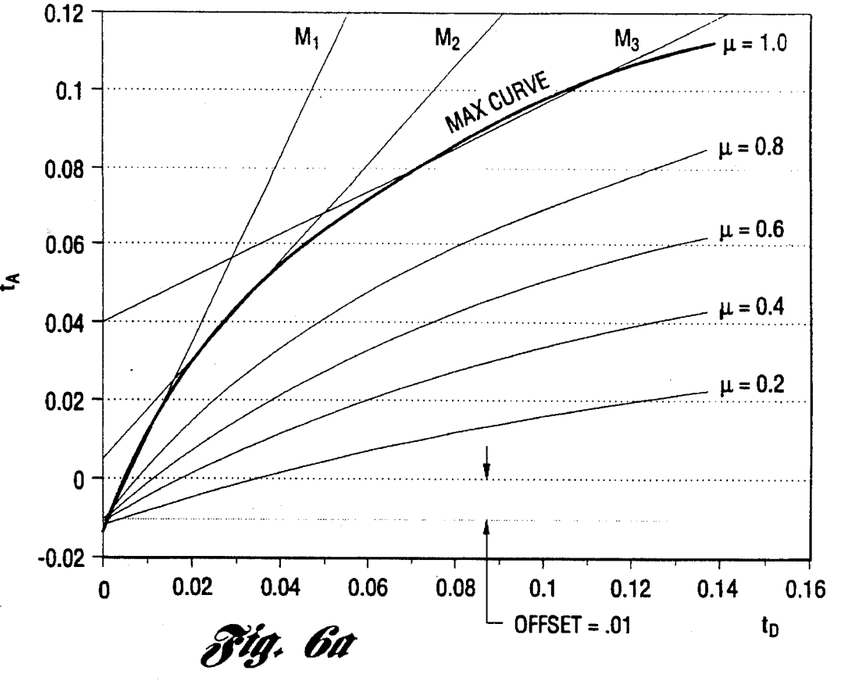
FIG. 6a is a graphical illustration of a family of curves that can be used to approximate the desired apply-to-dump characteristic as embodied by FIG. 5b.

Referring now to FIG. 6a, which represents an example plot of Equation #26, there is shown one such family of curves. Although this family of curves is different for different master cylinder pressures, the basic nature of the curves is the same. A certain set of conditions, for which the shape of the apply-to-dump characteristic is most critical, for example for a certain $P_H$ and μ= 1.0, is selected and that shape is contained within the predictive pressure controller 46 shown in FIG. 5b. Line segments inscribed on this set of curves can be used to approximate the desired apply-to-dump characteristic, which is labeled "MAX CURVE" in FIG. 6a. The predictive pressure controller 46 then utilizes this curve approximation to calculate a net apply time $t_A$ that will result in the pressure being restored to the desired value at the particular μ.

Figure 6B:
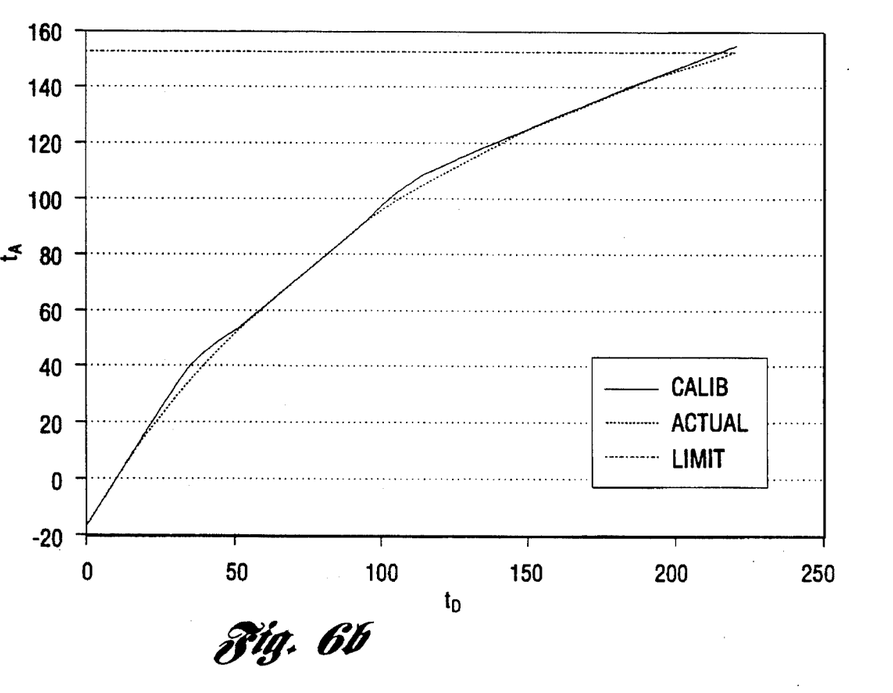
FIG. 6b shows a calibrated and an actual apply-to-dump curve for front pressure control along with a breakpoint approximation with whole number graduations corresponding to microprocessor units.

With combined reference to FIGS. 5b and 6a, the adaptive gain mechanism 48 has, as an input, the vehicle deceleration which represents μ, which multiplies the selected curve shape so that it sweeps through the full range, pivoting about the intersection point at the [x,y] coordinate defined as [0,OFFSET]. It can thus be seen that the curve tilts upward with increasing μ. The adaptive gain mechanism 48 further receives, as input, wheel cycle rate information so that robustness to parameter uncertainty is obtained by further pivoting the apply-to-dump curve to meet global performance objectives including a certain wheel departure cycle rate. As such, once the nominal curve is chosen, the algorithm operates to adjust the gain associated with the curve for optimal performance, essentially identifying the unknown master cylinder pressure. FIG. 6b shows an apply-to-dump curve for front pressure control along with a spreadsheet-generated breakpoint approximation.

Referring once again to FIG. 5a, multiplication block 50 adjusts the selected curve that describes the relationship between $t_D$ and $t_A$. The objective of the algorithm of the present invention is to return to within a certain pressure and thereafter go into an open-loop apply sequence. If the algorithm assumes that the pressure has been properly restored, and there is no departure for a very long time with the same open-loop pressure apply rate, then the algorithm did not utilize a high enough gain. Accordingly, the nominal curve should be adjusted, or tilted up, since the assumed relationship locally between apply and dump was incorrect and although the amount of the correction is not known, the direction for correction is known.

The multiplier 50, whose value may change, is a function of average vehicle deceleration and a fine tuner, with the vehicle acceleration used as a reference point. Thus, if the vehicle is on a high μ road surface as seen by the vehicle decelerometer, the multiplier value will be higher. As the vehicle deceleration grows, the nominal curve is pivoted up to use the high μ curve, as indicated in FIG. 6a. The fine tuning mechanism operates to correct for errors in the average vehicle deceleration and other uncertainties, such as for example, master cylinder pressure uncertainty. If $P_H$ is lower than that which was used to determine the nominal curve, the actual curve must made higher, allowing more apply time—this is accomplished by the fine tuner.

With reference again to FIG. 5b, it should be appreciated that the dump valve model 68 and apply valve model 70 embody the previously discussed relationships and take into consideration design parameters, such as orifice size, brake stiffness factor, brake fluid viscosity, proportional valve characteristics, and master cylinder pressure, as represented by the dotted lines. As indicated by block 64, the proportional valve is considered for the rear brakes. So as to control brake balance, the rear brake pressure is adjusted by a proportioning valve, whereas the front brakes are allowed to follow the master cylinder pressure. According to this brake balance, there is a pressure that increases to the front and a pressure that increases at a lower rate to the rear. This difference is illustrated in FIG. 3a. It should be appreciated that knowing these proportional valve characteristics allows one to identify the relationship between vehicle deceleration and pressure at the rear brakes.

Figure 7:
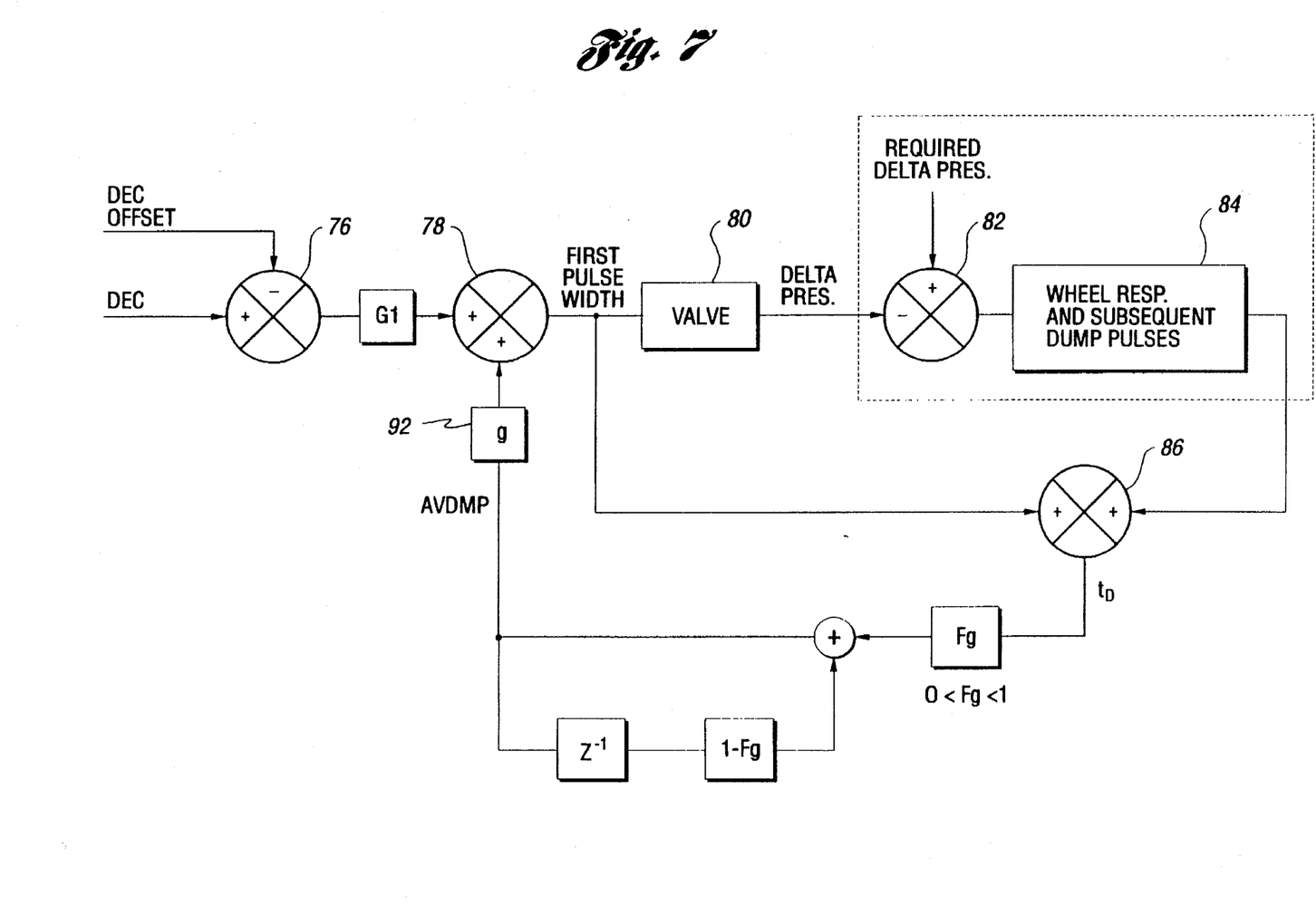
FIG. 7 is a block diagram describing the dynamics of the method of the dump mode portion of the present invention.

Referring now to FIG. 7, there is shown a block diagram describing adaptive dump control according to the present invention. It may be said that maintaining a high brake pressure without causing too much slip is a main objective of ABS control. This objective encompasses the fact that both high deceleration and good vehicle handling are desired. Pressure must be reduced if wheel lock is anticipated, however, it is desired to reduce the pressure by a minimum amount. The progression of a departure can be halted only if the rate of brake torque reduction due to the dump action is greater than the rate of torque reduction due to the μ-slip relation.

Minimum net pressure reduction is obtained if departure progression is halted in the shortest period of time. Assuming that the μ-slip relation has a peak, the minimum net pressure reduction is obtained if the departure progression is halted with the first dump pulse. Preferably, the control strategy is structured to try to halt departure progression with a single pulse. Since the tire-to-road μ is unknown as a function of slip, it is difficult to specify a priori what size to make the initial dump pulse since the same wheel behavior will not indicate the same degree of tire road instability for different μ-slip functions. As shown in FIG. 7, a closed-loop algorithm is therefore preferably used whose function, as its objective, is to generate a minimum initial dump pulse such that departure progression is halted. Once appropriately initialized, the algorithm adaptively adjusts itself.

If the initial pulse size is insufficient, additional or subsequent pulses will be required, and the next initial dump pulse can be increased accordingly in a closed-loop fashion. Similarly, if the initial dump pulse is sufficient to halt a departure, then the next initial dump pulse will be reduced in size in order to pursue the minimum pressure reduction objective. In practice, this algorithm structure continually hunts for the minimum initial dump pulse size sufficient to halt the progression of a departure for the current μ-slip relation. In other words, the closed-loop nature of this dump control removes the uncertainty of the dynamics under control.

In the preferred embodiment, adaptation of the initial dump pulse occurs after information regarding the first wheel departure is available. The algorithm takes a fraction of a running average of the dump times of previous departures (AVDMP), along with the current wheel deceleration information and executes the resulting dump pulse. If this dump pulse was the only pulse required, then the initial dump pulse for the next departure would be reduced, assuming that the wheel deceleration was the same as the prior wheel deceleration, since only a fraction of AVDMP will be used. The initial dump pulse continues to decrease, departure to departure, until subsequent dump pulses are required, in which case AVDMP would be increased. As a result, through the duration of the ABS stop, the initial pulse size will converge to an optimal value, and oscillate as it seeks to meet the single pulse and minimum pulse size criterion. The dynamics of this process can be considered in terms of speed of response and stability.

As shown in FIG. 7, a current wheel deceleration (DEC) signal is combined with a deceleration offset signal at summer 76. The output of the summer 76, which contains local and current information concerning wheel behavior, is then modified by a constant G1 and provided to summer 78 along with the AVDMP information as calculated through prior departure cycles. In response to the application of a pulse width, the valve 80 dumps and a delta pressure is generated. If this initial dump pulse (W1) was sufficient to permit the wheel to properly recover, the delta pressure equals the previously unknown required delta pressure (block 82) and no additional, subsequent pulses (block 84) are required. As a result, the net dump time generated at summing junction 86 represents only the initial dump pulse time. This dump time ($t_{D1}$) is then filtered by an averaging filter, such as digital filter shown generally by reference numeral 90, and contributes to the average dump time (AVDMP) for the next dump. Thus, filter 90 operates to maintain a running average of dump times, imparting to the controller the benefit of learning from history.

Considering the filter 90 as a generic analog filter a/(S+a), the transfer function between wheel deceleration and initial pulse size W can be approximated by:

$$\frac{W}{D} = \frac{G1(s+a)}{[s+a(1-g)]} \quad (27)$$

where a= Fg/(T*(1−Fg)) and is found by substituting for the delay operator z−1= (1−Ts) into the transfer function of the digital filter, and T is the departure-to-departure update time. In a preferred embodiment, this algorithm is functioning according to design with g= ¾ and the averaging process being $$AVDMP=(1-Fg)t_D+Fg(AVDMP) \quad (28)$$

although other values for g, or other filtering arrangements, are of course possible.

Thus, in order to implement the goal of identifying the minimum dump pulse size required to contain the departure, the average dump time is fractionally reduced by g (block 92). Thus, the next initial dump pulse (W2) will be smaller in magnitude if the previous initial dump pulse was sufficient. For discussion purposes, assume this next initial dump pulse is insufficient. As such, this initial dump pulse W2 did not generate a sufficient delta pressure (block 82) and subsequent pulses, which supplement the initial dump pulse, are required (block 84). As a result, the net dump time generated by summing junction 86 ($t_{D2}$) represents both the dump pulse W2 plus the subsequent pulses ($t_{D2} > t_{D1}$). This net dump time $t_{D2}$ is filtered (filter 90) and contributes to the average dump utilized to determine the magnitude of the next initial dump pulse W3. This process continues, and unless initial dump pulse W3 is sufficient to contain the departure, subsequent pulses will again be required and initial dump pulse W4 will be larger than the preceding pulse W3.

With continuing reference to FIG. 7, the adaptive dump control also takes into consideration the effects of varying wheel decelerations from departure to departure. Thus, in addition to considering what happened before regarding dump time, the strategy of the present invention takes into account current deceleration information. For example, if the wheel is undergoing high deceleration, it is desirable to bias the strategy toward reducing pressure. Accordingly, wheel deceleration is an input to the strategy. More specifically, current wheel deceleration, after being modified by a predetermined deceleration offset at summing junction 76 and by a scaling constant G1 is combined with AVDMP at summing junction 78. It can be seen that as wheel deceleration increases, the initial pulses similarly increase.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

What is claimed is:

1. For use with a vehicle having a plurality of wheels each having a brake, and a vehicular antilock braking system including an electronic control unit, a method for brake pressure control during vehicle braking, the method comprising:

increasing brake pressure at at least one wheel so as to attain a prereduction peak brake pressure;

initiating an adaptive pressure reduction mode of operation wherein brake fluid flows from the brake of the at least one wheel the adaptive pressure reduction mode of operation including:

determining a first initial dump actuator energization time;

energizing a dump actuator according to the dump actuator energization time so as to change the brake pressure;

determining whether the change in brake pressure was sufficient to permit the at least one wheel to recover from the departure;

determining at least one subsequent dump actuator energization time if the change in brake pressure was insufficient to permit the at least one wheel to recover from the departure; and re-energizing the dump actuator according to the at least one subsequent dump actuator energization time;

determining, based on the prereduction peak brake pressure, a brake apply pulse required to restore brake pressure to within a pressure window of the prereduction peak brake pressure; and restoring the brake pressure at the at least one wheel to within the pressure window of the peak brake pressure after termination of the pressure reduction mode of operation.

2. The method of claim 1 wherein increasing brake pressure comprises initiating a brake apply mode of operation so as to force a departure between the velocity of the at least one wheel and a reference velocity which exceeds a predetermined threshold, and to obtain the prereduction peak brake pressure.

3. The method of claim 1 wherein restoring the brake pressure comprises:

determining an apply actuator energization time required to store the brake pressure to within the pressure window of the peak brake pressure; and energizing an apply actuator according to the energization time, thereby restoring the brake pressure to within the pressure window of the peak brake pressure.

4. The method of claim 3 wherein the apply actuator energization time for restoring brake pressure is determined according to $$t_A = \frac{A\cos\left(\frac{1 - 2[POd - PC]}{P_H}\right)}{KBa*25*II*DD^2} - \frac{A\cos\left(\frac{1 - POd*e^{(-25*II*DD^2*KBd*t_D)}}{P_H}\right)}{KBa*25*II*DA^2}$$

wherein POd represents brake pressure just prior to pressure reduction, PC represents a pressure control window within which the brake pressure is restored, $P_H$ represents a high pressure source, DD and DA represent pressure reduction and pressure restoration valve orifice diameters respectively, $t_D$ represents net pressure reduction actuator energization time, and KBd and KBa represent pressure reduction and pressure restoration P-V curve fit constants, respectively.

5. The method of claim 3 wherein the pressure window is about 100–150 psi.

6. The method according to claim 1 wherein initiating the pressure reduction mode of operation comprises determining a dump actuator energization time required to reduce the brake pressure by an amount sufficient to permit the at least one wheel to recover from the departure; and energizing a dump actuator according to the dump actuator energization time, thereby reducing the brake pressure.

7. The method of claim 6 wherein the dump actuator energization time for reducing brake pressure is determined adaptively.

8. The method of claim 1 further comprising:

determining a second initial dump actuator energization time based on the duration of the first initial dump actuator energization time and the duration of the at least one subsequent dump actuator energization time;

reducing the magnitude of the second initial dump actuator energization time by a predetermined amount so as to minimize dump actuator energization time; and energizing the dump actuator according to the reduced dump actuator energization time.

9. The method of claim 8 further comprising determining whether the change in brake pressure resulting from energization according to the reduced dump actuator was sufficient to permit the at least one wheel to recover from the departure.

10. The method of claim 1 further comprising repeating the determining, reducing and energizing steps so long as the reduced dump actuator energization times are sufficient to permit the at least one wheel to recover from the departure, so as to minimize dump actuator energization time.

11. For use with a vehicle having a plurality of wheels each having a brake, and a vehicular antilock braking system including an electronic control unit, a method for brake pressure control during vehicle braking, the method comprising:

increasing brake pressure at at least one wheel so as to attain a prereduction peak brake pressure;

initiating an adaptive pressure reduction mode of operation wherein brake fluid flows from the brake of the at least one wheel, the adaptive pressure reduction mode of operation including:

determining a first initial dump actuator energization time;

energizing a dump actuator according to the dump actuator energization time so as to change the brake pressure;

determining whether the change in brake pressure was sufficient to permit the at least one wheel to recover from the departure;

determining a second initial dump actuator energization time if the change in brake pressure was sufficient to permit the at least one wheel to recover from the departure;

reducing the magnitude of the second initial dump actuator energization time by a predetermined amount so as to minimize dump actuator energization time; and energizing the dump actuator according to the reduced dump actuator energization time;

determining, based on the prereduction peak brake pressure, a brake apply pulse required to restore brake pressure to within a pressure window of the prereduction peak brake pressure; and restoring the brake pressure at the at least one wheel to within the pressure window of the peak brake pressure after termination of the pressure reduction mode of operation.

12. For use with a vehicle having a plurality of wheels each having a brake, and a vehicular antilock braking system including an electronic control unit, a method for brake pressure control during vehicle braking, the method comprising:

initiating a brake apply mode of operation so as to force a departure between the velocity of the at least one wheel and a reference velocity which exceeds a predetermined threshold to obtain a prereduction peak brake pressure;

initiating a pressure reduction mode of operation wherein brake fluid flows from the brake of the at least one wheel;

identifying a desired brake pressure to which the brake pressure is to be restored;

determining, based on the prereduction peak brake pressure, an apply actuator energization time required to restore the brake pressure to the desired brake pressure; and energizing an apply actuator according to the energization time, thereby restoring the brake pressure at the at least one wheel to the desired brake pressure;

wherein the apply actuator energization time for restoring brake pressure is determined according to $$t_A = \frac{A\cos\left(\frac{1-2[POd-PC]}{P_H}\right)}{KBa*25*II*DD^2} - \frac{A\cos\left(\frac{1-POd*e^{(-25*II*DD^2*KBd*t_D)}}{P_H}\right)}{KBa*25*II*DA^2}$$

where POd represents brake pressure just prior to pressure reduction, PC represents a pressure control window within which the brake pressure is restored, $P_H$ represents a high pressure source, DD and DA represent pressure reduction and pressure restoration valve orifice diameters respectively, $t_D$ represents net pressure reduction actuator energization time, and KBd and KBa represent pressure reduction and pressure restoration P-V curve fit constants, respectively.

13. For use with a vehicle having a plurality of wheels each having a brake, and a vehicular antilock braking system including an electronic control unit, a method for brake pressure control during vehicle braking, the method comprising:

increasing brake pressure at at least one wheel so as to attain a prereduction peak brake pressure;

initiating a pressure reduction mode of operation by energizing a dump actuator adaptively so as to acceptably minimize the dump actuator energization time; and restoring the brake pressure at the at least one wheel to within a pressure window of the peak brake pressure by energizing an apply actuator for a time determined according to $$t_A = \frac{A\cos\left(\frac{1-2[POd-PC]}{P_H}\right)}{KBa*25*II*DD^2} - \frac{A\cos\left(\frac{1-POd*e^{(-25*II*DD^2*KBd*t_D)}}{P_H}\right)}{KBa*25*II*DA^2}$$

wherein PC represents a pressure control window within which the brake pressure is restored, $P_H$ represents a high pressure source, DA represents a pressure restoration valve orifice diameters respectively, and KBa represents a pressure restoration P-V curve fit constants.

* * * * *